Patented Feb. 4, 1941

2,230,267

UNITED STATES PATENT OFFICE 2,230,267

BONDED CARBON COMPOSITION

Samuel Ruben, New Rochelle, N. Y.

No Drawing. Application October 17, 1939,
Serial No. 299,847

6 Claims. (Cl. 106—9)

This invention relates to the production of dense low resistance carbon bodies, specifically to carbon bodies of the type suitable for electrical contacts, brushes, welding rods, battery electrodes, bearings, etcetera.

Heretofore in order to produce low resistance rods or other shaped bodies of carbon or graphite, various binders have been used to provide bonding and pressing of the carbon particles. When such binders have been used a baking operation has been necessary, usually to decompose the bonding agent so as to render it conductive, as by carbonization of organic binders, or to volatilize out inorganic binders. The processing of the carbon or graphite material has required a treatment of long duration, sometimes in the order of several days, to avoid vapor or gas changes of the bonding agent, which would cause porosity or high resistance.

In the present invention I overcome defects of the prior art methods by utilizing a conductive bonding agent which is heated to its melting point and which thoroughly bonds the carbon particles together, reducing the contact resistance between the grains which is inherent in carbon or graphite bodies, and which allows rapid uniform production of carbon or graphite members having a dense metallic-like structure. The time required in the process is relatively short and low resistance, dense, bonded carbon bodies are produced without lengthy aging.

Essentially the invention comprises the use of vanadium pentoxide as a bonding agent for the carbon particles. In the process, the vanadium pentoxide is mixed together with the carbon or graphite, the two materials being combined in any desired proportion, ground together, thereafter pressed into the desired form and then heated to a temperature in the order of 690 degrees C., the melting point of vanadium pentoxide. At this temperature the oxide liquefies, spreads over the surfaces of the carbon particles and on cooling, bonds the entire mass into a dense metallic-like structure. The material so processed can be used for a variety of purposes such as for motor brushes, electrical contacts, battery electrodes, welding rods and when graphite is used, for self-lubricating bearings. The percentage of vanadium pentoxide employed may be varied, dependent upon the mechanical strength or electrical resistance desired. For applications on commutators I have utilized a mixture composed of 10% vanadium pentoxide and 90% by weight of graphite. When higher resistance is desired the graphite may be supplanted by carbon or other higher resistant carbon.

For most applications I prefer to keep the percentage of vanadium pentoxide used below 50% but for some applications and where excess temperatures are not encountered, the percentage of vanadium pentoxide may be increased above 50%.

For some purposes it may be desirable to add a metal to the carbon-vanadium pentoxide mixture. This may be readily accomplished by mixing the desired metal or metals in particle form with the vanadium pentoxide and carbon and grinding the combined materials together. Such composite vanadium pentoxide-carbon-metal mixtures may be processed in the same manner as the vanadium pentoxide-carbon mixtures. Among the suitable metals may be mentioned copper, bronze, silver, etcetera. It is also possible to add to the vanadium pentoxide-carbon or vanadium pentoxide-carbon-metal mixtures, one or more conductive oxides, such as cadmium oxide.

What is claimed is:

1. A composition of matter comprising essentially carbon particles and vanadium pentoxide.

2. A solid composition of matter comprising essentially finely divided carbon particles bonded by vanadium pentoxide.

3. A composition of matter for electrical contacts, brushes, bearings, electrodes and the like, comprising essentially vanadium pentoxide and carbon.

4. The composition set out in claim 3 characterized by the addition of finely divided metal particles.

5. The composition set out in claim 3 characterized by the addition of a conductive oxide.

6. The method of making a dense bonded composition of matter which comprises mixing together vanadium pentoxide and carbon and heating the mixture up to a temperature at least in the order of 690 degrees C.

SAMUEL RUBEN.